United States Patent [19]
Dittner et al.

[11] Patent Number: 5,172,046
[45] Date of Patent: Dec. 15, 1992

[54] ELECTRIC GENERATOR

[75] Inventors: Adam Dittner; Norbert Oberlack, both of Höchstadt, Fed. Rep. of Germany

[73] Assignee: Fag Kugelfischer Georg Schafer, Fed. Rep. of Germany

[21] Appl. No.: 743,123

[22] Filed: Aug. 9, 1991

[30] Foreign Application Priority Data

Aug. 11, 1990 [DE] Fed. Rep. of Germany ....... 4025557

[51] Int. Cl.⁵ ............................................. H02J 7/14
[52] U.S. Cl. ...................................... 320/61; 320/51; 322/89; 322/95
[58] Field of Search ...................... 320/51, 61; 322/89, 322/95, 52, 96

[56] References Cited

U.S. PATENT DOCUMENTS

| | | | |
|---|---|---|---|
| 3,736,490 | 5/1973 | Fallon et al. | 320/39 |
| 3,755,767 | 8/1973 | Hendrickson | 336/20 |
| 3,757,198 | 9/1973 | Hill | 322/95 |
| 4,217,541 | 8/1980 | Weintraub | 323/51 |
| 4,692,681 | 9/1987 | Nilssen | 320/2 |

FOREIGN PATENT DOCUMENTS 1463567 11/1963 Fed. Rep. of Germany .
725374 5/1953 United Kingdom .

Primary Examiner—Steven L. Stephan
Assistant Examiner—Adolf Berhane
Attorney, Agent, or Firm—Ostrolenk, Faber, Gerb & Soffen

[57] ABSTRACT

An electric generator is provided including a rotor having a surface with permanent magnets disposed thereon. A stator is provided having an electrical winding wound thereon in grooves in the stator. An air gap is disposed between the stator and rotor. The electrical winding of the stator is connected to a variable inductance. The value of the variable inductance is controlled by a control stage. The output of the variable inductance is connected to a rectifier which feeds direct electrical current to a current accumulator device, for example, a storage battery. The variable inductance is controlled by the control circuit such that the electrical current from the electric generator is maintained substantially constant for a particular load by the adjustment of the inductance of the variable inductance.

19 Claims, 2 Drawing Sheets

ELECTRIC GENERATOR

BACKGROUND OF THE INVENTION

The present invention relates to an electric generator, in particular for motor vehicles in which the internal combustion engine drives the generator and the latter charges a current-accumulator/battery. Modern motor vehicles have a large number of current-consuming devices such as lights, wiper motors, radio/recorders, fuel pumps, water pumps for windshield-wiping and washing systems, electric fans, heating fans, rear-window heating, power windows, etc. The electric power consumption of the electrical system of a motor vehicle is today already between 800 and 1100 watts, without taking into consideration the short-time current-consuming device, namely the starter, which, depending on its arrangement, may consume 800 to 3000 watts.

The generators must be so designed that upon normal operation of the vehicle on highways, super highways and in city traffic, the average generator current exceeds the sum of the current of all consumption devices so that the battery is charged. The generator current is not available with speeds of rotation of the generator of up to 1000 rpm and it reaches its rated current value with generator speeds of rotation of between 4000 and 6000 rpm.

Modern motor vehicles have rated generator currents of between 65 and 110 amperes, rated currents of 140 amperes being already known in the case of high-performance production cars.

The present density of traffic and the constantly increasing number of current-consuming devices in cars necessarily leads to larger battery capacities and to electrical generators which are capable of greater power, i.e. are larger and require more drive energy.

"Stop and go" traffic can, for instance, have the result that while the car can be driven to its parking place with its own drive power, but because there has been no charging of the battery but only a discharge, the current supplied by the battery is no longer sufficient to start the internal combustion engine again by means of the electric starter.

In order that charge current of the generator is available even at idling speed of the internal combustion engine (about 700 rpm), transmission ratios of 2:1 have been provided, so that the generator rotates with twice the speed of rotation of the engine. In order further to increase the charge current upon idling speed of rotation, even higher transmission ratios would be required. With the highest speed of rotation of the engine, however, the speed of rotation of the generator attains speeds which cannot be controlled by traditional, economically feasible means. For this reason, it has been attempted to avoid these difficulties by means of a switchable transmission, but the expense and the considerably large structural dimensions have prevented the introduction thereof in vehicles.

Solutions which increase the voltage of the electrical system to 24 volts in order in this way to have fewer electrical losses due to decreased current requirements in the case of a large number of devices have also been discussed Such an increase in voltage, however, also results in a large number of disadvantages such as, for instance, a thinner incandescent filament in incandescent lamp bulbs, which makes focusing difficult and shortens the lifespan and larger transient voltages due to inductive components, as well as the danger of the occurrence of arcs at contacts, and the need to transform the voltage for standard digital and analog components which operate today at the 12 volt level, etc.

SUMMARY OF THE INVENTION

It is an object of the present invention to provide an electric generator which, for the same speed of rotation, approximately the same weight and approximately the same structural dimensions as the known electrical generators, supplies a higher charge current than the conventional generators, even at an idling speed of rotation of the drive engine of about 700 rpm.

The above and other objects of the present invention are achieved by an electric generator adapted to be driven by a drive motor, the generator comprising a rotor driven by said drive motor, the rotor having provided thereon a plurality of permanent magnets; a stator having at least one electrical winding thereon for providing a changing voltage when there is relative movement of said rotor and stator; and a variable inductance coupled to said electrical winding for providing an alternating electrical current at an output of said variable inductance.

Other features and advantages of the present invention will become apparent from the following description of the invention which refers to the accompanying drawings.

BRIEF DESCRIPTION OF THE DRAWINGS

The invention will be described in greater detail in the following detailed description with reference to the drawings in which.

DETAILED DESCRIPTION

Figure 1:
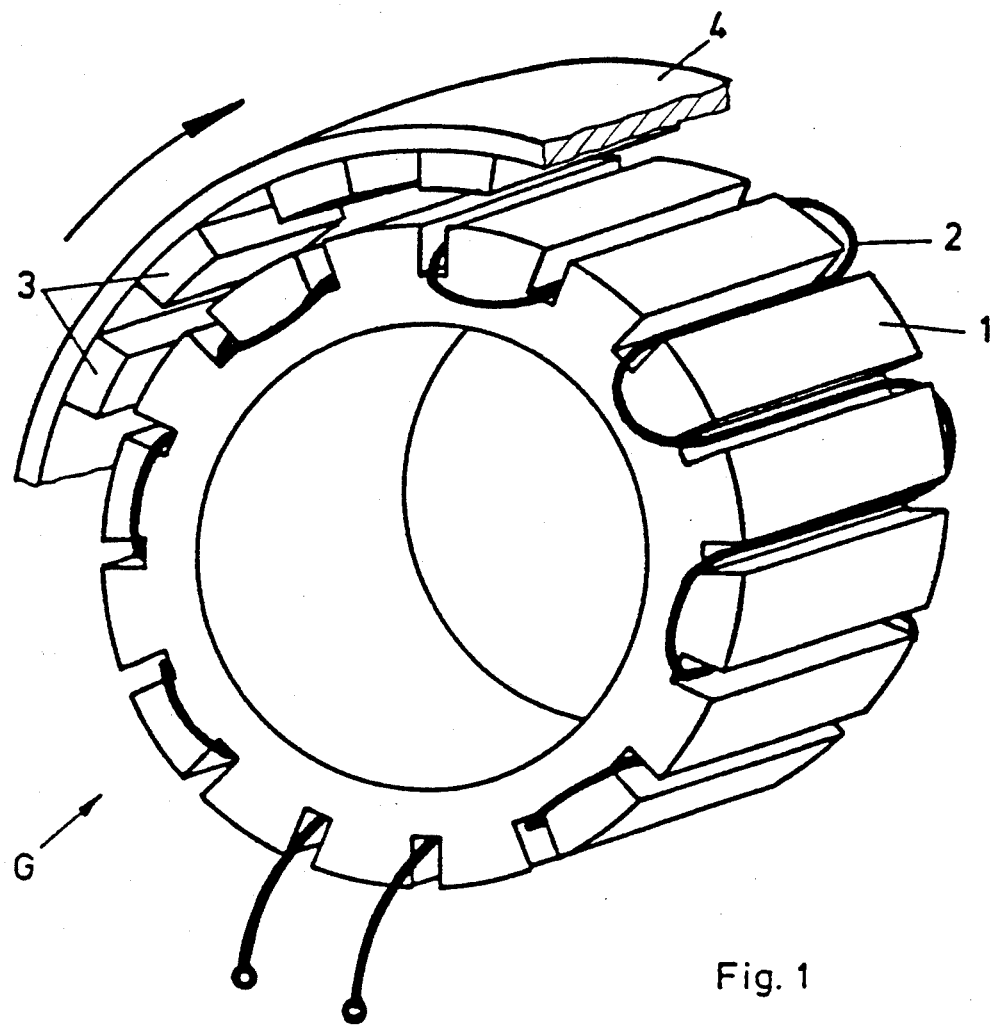
FIG. 1 is a perspective view of a single-phase electric generator according to the present invention with partially cut and removed rotor.

With reference now to the drawings, the generator according to an exemplary embodiment of the present invention is identified generally with G and has a stator 1 and a rotor 4. In the drawing, a winding 2 is inserted into the grooves of the stator 1, so that a single-phase generator G is shown. In case of development as a multi-phase generator, the required windings 2 can be introduced either into the same grooves or into additional grooves.

In the embodiment, the rotor 4 is an external rotor comprising a rotatable iron short-circuit ring having on its inner circumferential surface bar-shaped permanent magnets 3, which consist of rare-earth compounds and produce a radially directed magnetic field in the air gap towards the stator 1. The permanent magnets 3 can be so arranged that they cover the entire inner circumferential surface, each permanent magnet being as wide in circumferential direction as the distance between the grooves in the stator 1. The permanent magnets can, however, also, as shown for example in FIG. 1, be narrower in circumferential direction than the distance between the grooves and be arranged at equal distances apart.

Figure 2:
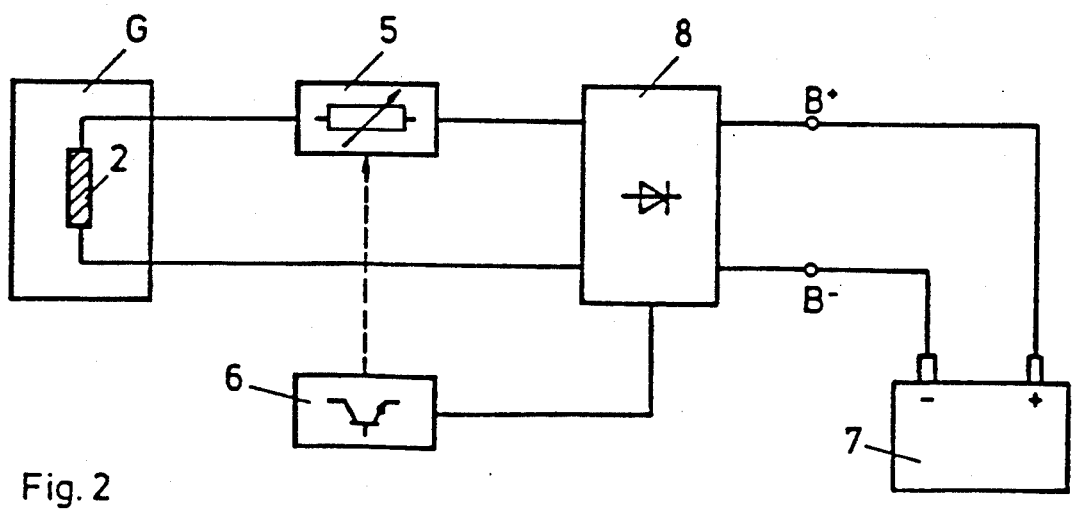
FIG. 2 is a block diagram showing the electric generator according to the present invention in a vehicle electrical circuit.

The manner of operation will be explained with reference to the block diagram of FIG. 2. As shown in FIG. 2, the stator winding 2 of the generator G delivers current through a variable inductance 5 to a rectifier stage 8. A regulator 6 senses the voltage at the rectifier 8, and uses the sensed voltage to control the variable inductance. The output of the rectifier stage 8 is fed to the current accumulator or battery 7.

If one first considers the case in which the entire surface of the rotor is occupied by permanent magnets 3, then the winding 2 of the generator supplies a square-wave alternating voltage since, upon rotation of the rotor 4 with constant speed of rotation, the magnetic flux in the poles of the stator 1 changes in a manner proportional to time. The arrangement of the permanent magnets at a given distance from each other leads to zero voltage phases in the square-wave voltage. The ratio between the duration of the voltage phase and the duration of the zero voltage phase depends on the ratio of the width of the permanent magnets 3 in circumferential direction to their distance apart. By suitable selection of this ratio, one can obtain an optimum between the required size of the permanent magnets 3, the structural size of the variable inductance 5, the relationship of the charging current to the speed of rotation and—in the case of a multi-phase system—the ripple of the charge current.

Figure 3:
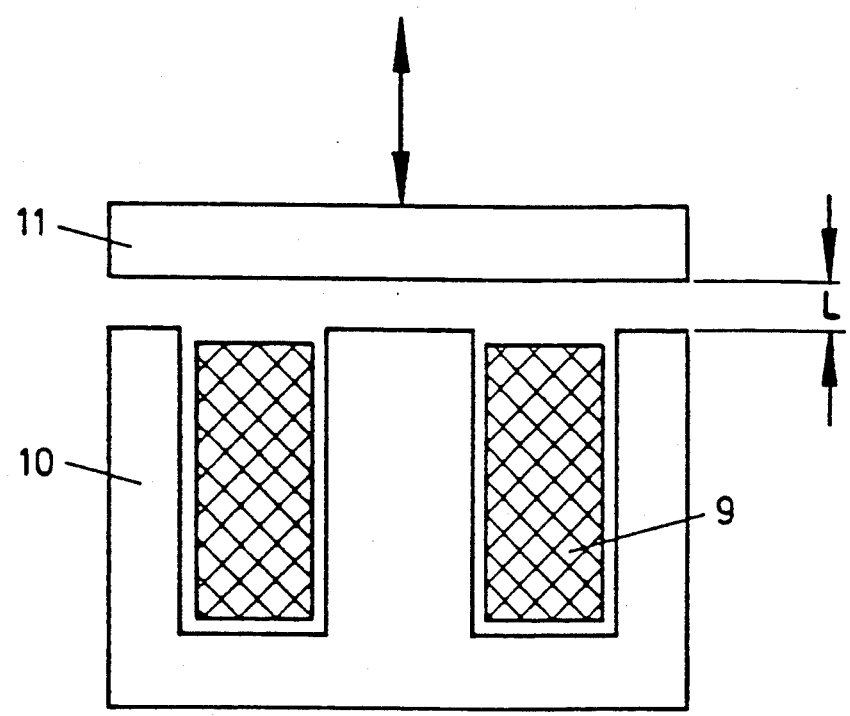
FIG. 3 shows how adjustable inductance can be achieved in the electric generator according to the present invention.

By means of the variable inductance 5, the alternating voltage produced by the generator 4 is converted into an alternating current. The construction in principle of a variable inductance is shown in FIG. 3 and will be explained below. By means of the rectifier 8, the alternating current is converted into a pulsating direct current which can be used as a charging current for the battery 7. The value of the average charging current can be varied by varying the inductance 5. The regulator 6 adjusts the inductance to a desired value as a function of the voltage between the terminals B+ and B−. Once the value of the variable inductance 5 has been set, the charge current remains substantially constant over a wide voltage range of the generator B, i.e. changes in speed of rotation of the drive engine change the charging current only insignificantly.

FIG. 3 shows, in a sectional view, the principle of a variable inductance 5. In FIG. 3, a cross-section through the variable inductance is shown. The variable inductance includes a winding 9 disposed about an iron core 10. The alternating voltage produced by the generator G is fed to one end of the winding 9. The other end of the winding 9 is connected to the rectifier 8 so that an alternating current flows through the winding 9. This alternating current produces an alternating magnetic flux in the iron core 10, the short-circuit iron 11 and the air gap L, whereby the entire arrangement forms the inductance 5. The value of the inductance 5 is dependent on the size of the air gap L. Therefore, by changing the distance L between iron core 10 and short-circuit iron 11 by means of the regulator 6, the inductance can be varied.

The reason why the generator according to the invention, with the same dimensions and power class, provides better performance than the previously known generator will now be explained.

A prerequisite is the use of permanent magnets 3 of high energy density so that it is possible to develop a voltage-stable generator having an armature reaction which does not lead to any substantial voltage changes as compared with the known, externally excited, generators, as a result of which the output voltage can be affected only minimally by the load current which is flowing.

With low speeds of rotation, a higher charge current is available with the generator of the invention, since the electromotive force (EMF) formed by the product of the magnetic induction in the air gap (B) times the conductor length of the winding 2 (L) times the circumferential speed of the rotor 4 (V) is greater than in the case of an externally excited generator since $B_{permanent\ magnet}$ is greater than $B_{externally\ excited}$ because greater magnetic energy is available in the same structural space so that, in accordance with the formula $EMF = B \times L \times V$, the EMF in accordance with the invention is greater than the EMF in accordance with the prior art.

Since such an EMF cannot be regulated, a controlled charging current can be produced only with a variable inductance 5 arranged following the generator.

Another advantage of the generator of the invention is that it gives off a "usable" current at low speeds of rotation. When the battery 7 is discharged, a vehicle having the known generator cannot be started even by pushing it with gears engaged (assuming a manual transmission), since no current is available for the ignition and possibly other circuits, such as fuel injection circuits, and the conventional externally excited generator, in contrast to the generator of the invention having permanent magnets, cannot produce any current since no current is available from the battery for the external field excitation either.

In the case of the present invention, due to the use of permanent magnets, if the vehicle is pushed with engine engaged when the current accumulator 7 is completely discharged, i.e., "push-started" with a "dead" battery, it is still possible to provide enough current from the electric generator to power the ignition and fuel injection circuits, thereby allowing the vehicle engine to be push-started.

In the foregoing specification, the invention has been described with reference to a specific exemplary embodiment thereof It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. An electric generator adapted to be driven by a drive motor, the generator comprising a rotor driven by said drive motor, the rotor provided thereon a plurality of permanent magnets; a stator having at least one first electrical winding thereon for providing a changing voltage when there is relative movement of said rotor and stator; and a variable inductance coupled to said first electrical winding for providing an alternating electrical current at an output of said variable inductance, the variable inductance comprising a second electrical winding coupled to said fist electrical winding and being disposed about a core comprising a magnetic circuit, the magnetic circuit being close through at least one variable air gap, said air gap being variable to vary said variable inductance.

2. The electric generator recited in claim 1, wherein said rotor comprises a member having a longitudinal direction, and said permanent magnets comprise bar-shaped permanent magnets having a longitudinal direction disposed in the longitudinal direction of said member, said plurality of permanent magnets disposed circumferentially along a surface of said member.

3. The electric generator recited in claim 2, wherein said permanent magnets are arranged with spacing between adjacent ones of said magnets.

4. The electric generator recited in claim 2, wherein said permanent magnets comprise rare-earth compounds.

5. The electric generator recited in claim 2, wherein said rotor comprises an external rotor comprising an annular ring with said stator disposed interiorly therewith, said magnets disposed on an inner surface of said annular ring.

6. The electric generator recited in claim 1, further comprising a rectifier coupled to the output of said variable inductance, said rectifier having an output adapted to be coupled to a current accumulator device.

7. The electric generator recited in claim 6, wherein said current accumulator comprises a stor—battery.

8. The electric generator recited in claim 1, further comprising means for sensing a parameter of an output voltage of said electric generator and for varying the value of the inductance of said variable inductance to maintain a current supplied to a load coupled to the electric generator substantially constant.

9. The electric generator recited in claim 8, further comprising a rectifier coupled to the output of said variable inductance, said rectifier having an output adapted to be coupled to a current accumulator device, and further wherein said means for sensing comprises means for sensing the output voltage of the rectifier.

10. The electric generator recited in claim 1, wherein the generator is adapted to be driven by a drive motor comprising the engine of a motor vehicle.

11. An electric generator adapted to be driven by a drive motor, the generator comprising a rotor driven by said drive motor, the rotor having provided thereon a plurality of permanent magnets; a stator having at least one first electrical winding thereon for providing a changing voltage when there is relative movement of said motor and stator; a variable inductance coupled to said electrical winding for providing an alternating electrical current at an output of said variable inductance, the variable inductance comprising a second electrical winding coupled to said first electrical winding and being disposed about a core comprising a magnetic circuit, the magnetic circuit being closed through at least one variable distance air gap, said air gap distance being variable to vary said variable inductance and further comprising means for sensing a parameter of an output of said second electrical winding and for varying the air gap and thus the value of said variable inductance to maintain a current supplied to a load coupled to the generator substantially constant.

12. The electric generator recited in claim 11, wherein said rotor comprises a member having a longitudinal direction, and said permanent magnets comprise bar-shaped permanent magnets having a longitudinal direction disposed in the longitudinal direction of said member, said plurality of permanent magnets disposed circumferentially along a surface of said member.

13. The electric generator recited in claim 12, wherein said permanent magnets comprise rare-earth compounds.

14. The electric generator recited in claim 12, wherein said permanent magnets are arranged with spacing between adjacent ones of said magnets.

15. The electric generator recited in claim 12, wherein said rotor comprises an external rotor comprising an annular ring with said stator disposed interiorly therewith, said magnets disposed on an inner surface of said annular ring.

16. The electric generator recited in claim 11, further comprising a rectifier coupled to the output of said variable inductance, said rectifier having an output adapted to be coupled to a current accumulator device.

17. The electric generator recited in claim 16, wherein said current accumulator comprises a storage battery.

18. The electric generator recited in claim 11, further comprising a rectifier coupled to the output of said variable inductance, said rectifier having an output adapted to be coupled to a current accumulator device, and further wherein said means for sensing comprises means for sensing the output voltage of the rectifier.

19. The electric generator recited in claim 11, wherein the generator is adapted to be driven by a drive motor comprising the engine of a motor vehicle.

* * * * *